United States Patent
Townsend

[11] 3,863,556
[45] Feb. 4, 1975

[54] MACHINE FOR INJECTING FLUIDS INTO MEAT PRODUCTS

[75] Inventor: Ray T. Townsend, Des Moines, Iowa

[73] Assignee: Townsend Engineering Company, Des Moines, Iowa

[22] Filed: Aug. 20, 1973

[21] Appl. No.: 390,079

[52] U.S. Cl.................... 99/487, 99/489, 99/533
[51] Int. Cl............................................. A22c 17/00
[58] Field of Search............... 99/487, 489, 532–533

[56] References Cited
UNITED STATES PATENTS

| | | | |
|---|---|---|---|
| 2,656,785 | 10/1953 | Gannon et al. | 99/532 |
| 2,756,666 | 7/1956 | Zaenkert | 99/533 |
| 3,381,603 | 5/1968 | Jensen et al. | 99/533 |
| 3,590,721 | 7/1971 | Hoffmann | 99/533 |
| 3,687,058 | 8/1972 | Townsend | 99/533 |

Primary Examiner—John W. Huckert
Assistant Examiner—Charles Gorenstein
Attorney, Agent, or Firm—Zarley, McKee, Thomte & Voorhees

[57] ABSTRACT

A machine for injecting fluid into meat products comprising a table having a conveyor means movably mounted thereon adapted to convey the meat product from one end to the other. A pair of reciprocating arms are pivotally connected at one end thereof to opposite sides of the table adjacent one end thereof. A power means is provided for causing the reciprocating arms to be moved upwardly and downwardly with respect to the conveyor means. A fluid manifold is rigidly secured to the other ends of the reciprocating arms and extends therebetween across the table transverse to the direction of travel of the meat product. The manifold comprises a plurality of injector needles extending downwardly therefrom which are adapted to pierce a meat product and inject fluid thereinto for a predetermined time period while the needles are embedded within the meat. The manifold is in fluid communication with a valve means which is in fluid communication with a source of fluid to be injected. A stripper plate means is secured at its opposite ends to the reciprocating arms at a point adjacent the fluid manifold for movement therewith. A pair of guide members slidably engage the ends of the stripper plate means to permit the opposite ends of the stripper plate means to engage a piece of meat having an irregular thickness. An actuator rod is pivotally connected at its lower end to the stripper plate means and extends upwardly therefrom. The actuator rod is connected at its upper end to a linkage means which is operatively connected to the valve means to control the flow of fluid to the manifold responsive to the thickness of the meat product as sensed by the stripper plate means. The linkage has a cam arm extending upwardly therefrom which has a roller at its upper end which is in engagement with an elongated cam slot formed in a vertically disposed plate member which is secured to the table. The engagement of the cam roller with the cam slot as the reciprocating arms are reciprocated causes the valve means to be opened for varying time intervals responsive to varying thicknesses of the meat product. The valve means also includes apparatus for maintaining a constant fluid pressure to the manifold.

17 Claims, 9 Drawing Figures

PATENTED FEB 4 1975 3,863,556

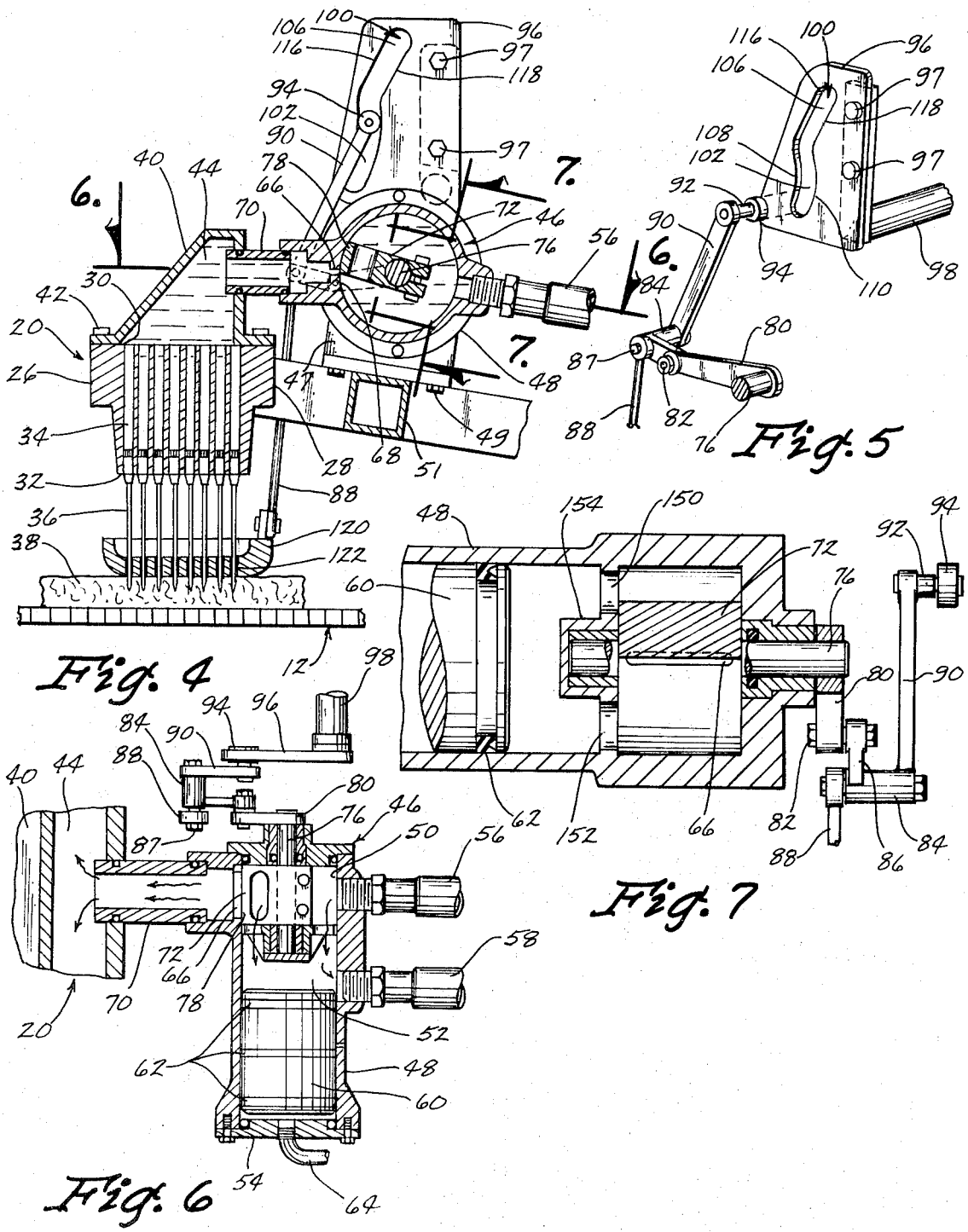

MACHINE FOR INJECTING FLUIDS INTO MEAT PRODUCTS

BACKGROUND OF THE INVENTION

Fluid injector machines are utilized to inject fluids such as pickling brines, flavoring additives, water, etc. into meat products. The pickling brines are injected into certain meat products such as pork bellies, bone-in hams, boneless hams, boneless pork butts, jowls, bacon squares, etc. to cure the same. Additionally, certain other fluids are injected into various meat products for such purposes as protein alteration, flavoring, etc.

Prior to the invention disclosed in U.S. Pat. No. 3,687,058, the fluid injector machines generally employed a plurality of reciprocal injector needles which pierced the meat so as to inject the fluid thereinto. In the previous machines, fluid was continually pumped through the needles which resulted in considerable fluid being spilled when the needles were not penetrating the meat product. An attempt was made to reduce the amount of wasted fluid by collecting the spilled fluid and recirculating the same through the fluid pump for subsequent use. The spilled fluid picked up blood and particles of meat which resulted in the particles accumulating in the pump and also resulted in the needles becoming plugged. Government regulations pertaining to such meat processing requires that the pumps, hoses, etc. of those machines be disassembled every few hours so that the interiors thereof can be cleaned to eliminate the possibility of bacteria or the like from forming therein.

The machine disclosed in U.S. Pat. No. 3,687,058 represented a significant advance in the art since means was disclosed for preventing the plugging of the injector needles and since means was disclosed for injecting the meat products only when the injector needles were piercing the meat product.

The meat products being injected frequently have irregular thicknesses from one end to the other which creates a problem since the injector machine was not able to sense such irregular thickness and an improper amount of fluid was injected thereinto.

Therefore, it is a principal object of the invention to provide an improved machine for injecting fluid into meat products.

A further object of the invention is to provide a machine for injecting fluid into meat products which senses the thickness or density of the product.

A further object of the invention is to provide a machine for injecting fluid into meat products which senses the "average" thickness of the meat product being injected.

A further object of the invention is to provide a machine for injecting fluid into meat products including an improved stripper plate means.

A further object of the invention is to provide a machine which senses the thickness of the meat being injected and automatically adjusts the time interval that fluid is injected into the meat according to the thickness of the meat.

A further object of the invention is to provide a machine for injecting fluid into meat products wherein the fluid pressure supplied to the fluid manifold remains constant.

A further object of the invention is to provide a machine for injecting fluid into meat products having a cam-linkage means provided thereon which is operatively connected to a manifold valve to precisely control the time interval that fluid is supplied to the injector needles.

A further object of the invention is to provide a machine for injecting fluid into meat products which is economical in manufacture and durable in use.

These and other objects will be apparent to those skilled in the art.

DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

FIG. 4 is a sectional view taken along lines 4 — 4 of FIG. 2;

FIG. 5 is a partial perspective view of the cam-linkage means;

FIG. 6 is a sectional view taken along lines 6 — 6 of FIG. 4;

FIG. 7 is a sectional view taken along lines 7 — 7 of FIG. 4;

DESCRIPTION OF THE PREFERRED EMBODIMENT

Figure 1:
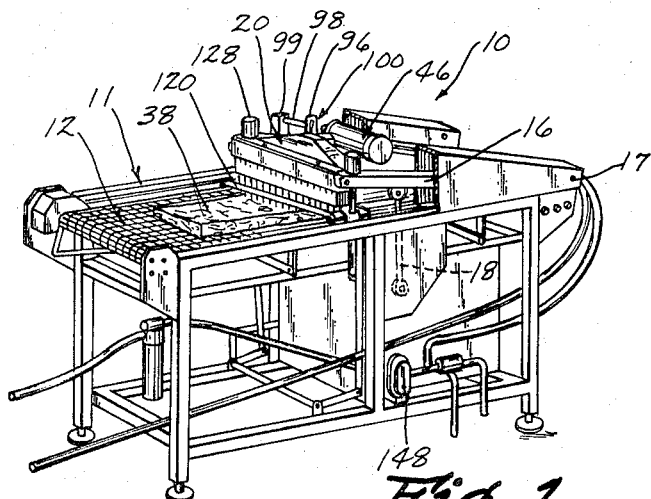
FIG. 1 is a front perspective view of the machine with portions thereof cut-away to more fully illustrate the invention.
Figure 2:
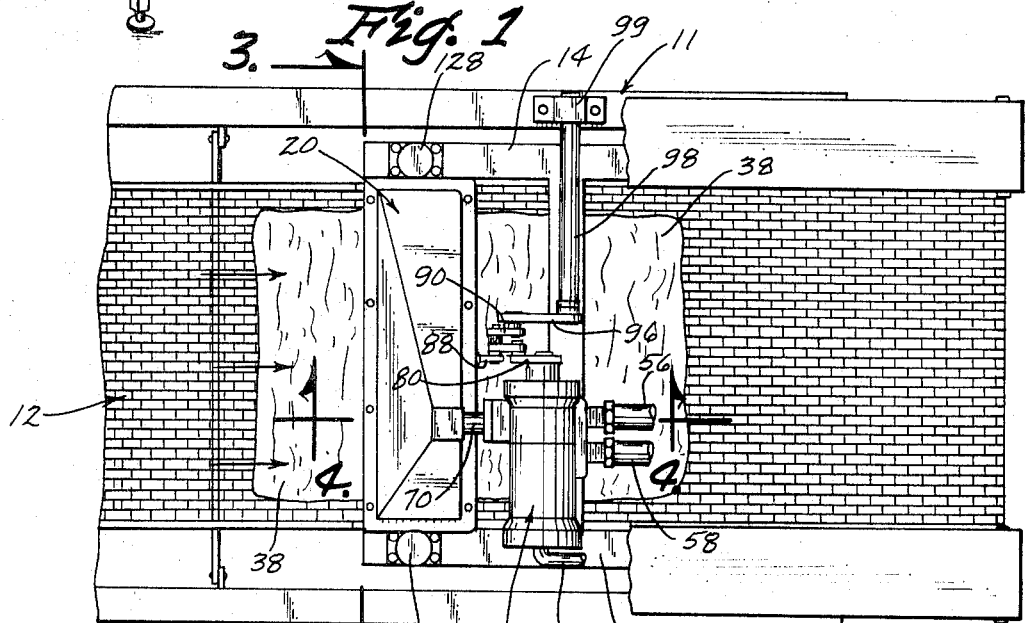
FIG. 2 is a partial top view of the machine with portions thereof cut-away to more fully illustrate the invention.

The injector machine of this invention is generally designated by the reference numeral 10 and is substantially identical to the injector machine 10 disclosed in U.S. Pat. No. 3,687,058 and hence will not be described in detail with reliance being made on the disclosure of said patent to complete this disclosure. Machine 10 generally comprises a table 11 having a conveyor means 12 provided thereon for conveying the meat product in the direction indicated by the arrows in FIG. 2. The numerals 14 and 16 refer to reciprocal arms which are pivotally connected at their rearward ends to the table 11 for swinging movement about an axis 17. The numeral 18 refers to a rod which is operatively connected to the power means for reciprocating the arms.

Figure 9:
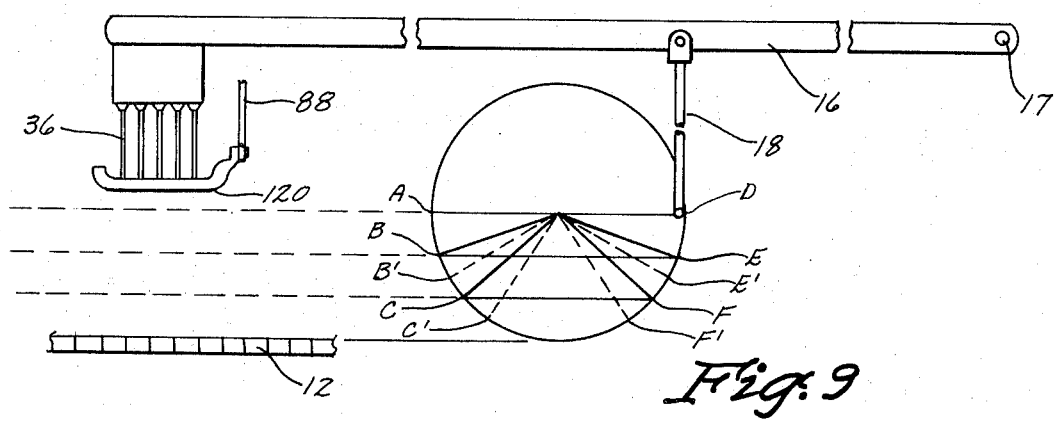
FIG. 9 is a schematic drawing illustrating the timing aspects of the fluid injection machine for different thicknesses of meat.

The power means for reciprocating the arms is a power driven pulley 19 which is shown schematically in FIG. 9 and which is similar to the pulley shown in U.S. Pat. No. 3,687,058. The lower end of rod 18 is pivotally mounted adjacent the perimeter of pulley 19 and therefore is reciprocated upwardly and downwardly to swing arms 14, 16 about axis 17.

The numeral 20 designates an injector manifold which is secured to the ends of the arms 14 and 16. Manifold 20 includes opposite ends 22 and 24, sides 26 and 28, top 30 and bottom 32. Manifold 20 has a plurality of closely spaced vertical bores 34 formed therein. The bores 34 are preferably arranged in rows. Injector needles 36 are mounted in the bores 34 for injecting fluid into the meat product generally designated by the reference numeral 38.

A manifold cover 40 is secured to manifold 20 by bolts 42. For purposes of description, manifold cover 40 will be described as having compartment portion 44 provided therein. A valve means 46 is secured to a brace 47 by bolts 49. Brace 47 is rigidly mounted to a cross bar 51 which extends between arms 14, 16 so that valve means 46 reciprocates in unison with arms 14, 16. Valve means 46 generally comprises a housing 48 having cylindrical chamber portions 50 and 52. The end of the housing 48 is closed by means of a cover 54. Inlet conduit 56 communicates with the rearward side of chamber portion 50 as illustrated in FIG. 6. Bypass conduit 58 communicates with one end of the chamber portion 52 as also illustrated in FIG. 6.

The numeral 60 refers to a piston which is slidable mounted in chamber portion 52. Piston 60 is provided with seals 62 which sealably engage the walls surrounding the chamber portion 52. Air conduit 64 is in communication with the outer end of chamber portion 52 to supply air under predetermined pressure against one end of the piston 60 to normally urge the piston 60 towards the chamber portion 50 so as to seal the bypass conduit 58.

An elongated horizontally disposed discharge port 66 is formed in the wall surface 68 of housing 48. Discharge port 66 is in communication with a discharge conduit 70 which is in communication with the chamber 44 of manifold cover 40.

The numeral 72 refers to a rotatable valve member which is rotatably mounted in the chamber portion 50 and having a shaft 76 rigidly secured thereto and extending outwardly from the housing as illustrated in FIG. 7. Valve member 72 has an arcuate surface 78 provided thereon which is adapted to sealably engage the wall 68 to selectively open and close the discharge port 66 as will be described in more detail hereinafter. A crank arm 80 is secured to the outer end of shaft 76 and has a bolt member 82 secured thereto. Crank arm 86 is pivotally secured to bolt 82. Collar 84 is secured to crank arm 86 by welding or the like. Bolt 87 pivotally connects collar 84 to the upper end of actuator rod 88. Arm 90 is secured to collar 84 by welding or the like and extends upwardly therefrom. Shaft 92 is secured to the upper end of arm 90 and has a cam roller 94 rotatably mounted on the outer end thereof.

The numeral 96 refers to a cam plate which is secured to arm 98 which in turn is secured to post 99 mounted on table 11. Thus cam plate 96 is stationary whereas valve housing 48 moves in unison with arms 14, 16. Cam plate 96 has an elongated cam slot 100 formed therein. For purposes of description, cam slot 100 will be described as having a lower end portion 102, and upper end portion 106. The numerals 108 and 110 refer to the cam surfaces which define the lower end portion 102. The reference numerals 116 and 118 generally refer to the cam surfaces which define the upper end portion 106. Upper end portion 106 follows a path approximately concentric with the pivotal axis 17 of arms 14, 16. Lower end portion 102 deviates from this concentric path for reasons set forth hereinafter.

The lower end of actuator rod 88 is pivotally connected to the center rearward portion of an elongated rectangular stripper plate 120 which has a plurality of openings 122 formed therein adapted to receive the injector needles 36 as illustrated in FIG. 4.

Figure 3:
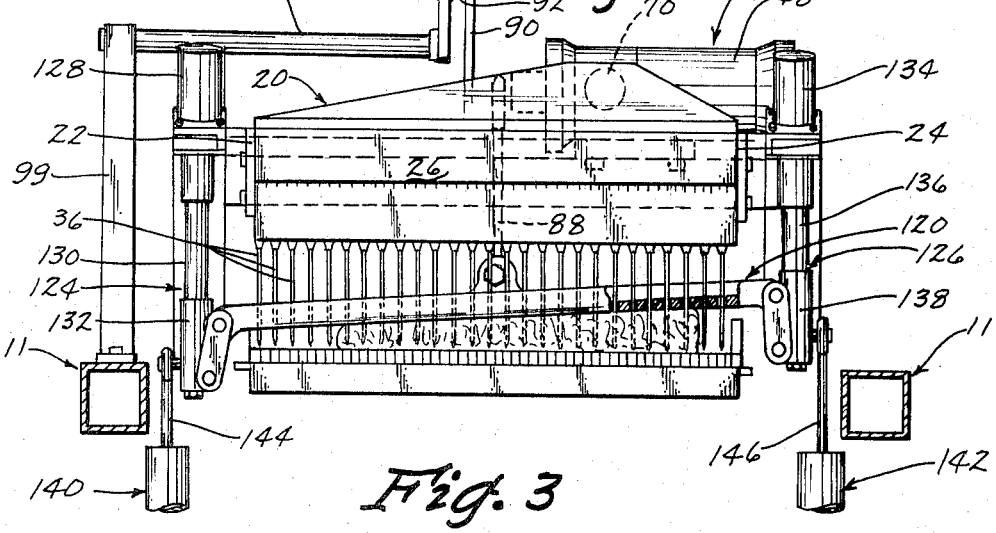
FIG. 3 is a sectional view taken along lines 3 — 3 of FIG. 2.

The numerals 124 and 126 generally designate the length adjustable members which connect the ends of the arms or manifold to the opposite ends of the stripper plate 120. Member 124 includes a fluid housing 128 having a rod 130 slidable extending downwardly therefrom. Collar 132 is secured to the lower end of the rod 130 and has one end of the stripper plate 120 pivotally secured thereto about a horizontal axis. Member 124 is much like a shock absorber. The valving in the member 124 permits the rod 130 to move upwardly within the housing 128 in response to engagement of stripper plate 120 engaging the meat on conveyor 12. Member 126 comprises a fluid housing 134 having a rod 136 extending downwardly therefrom as seen in FIG. 3. Collar 138 is secured to the lower end of rod 130 and has the other end of the stripper plate 120 pivotally secured thereto as seen in FIG. 3.

The numerals 140 and 142 refer generally to dash pots or one-way shock absorbers having rods 144 and 146 extending upwardly therefrom respectively. Rod 144 is pivotally connected to collar 132 while rod 146 is pivotally connected to collar 138. The dash pots 140 and 142 are adapted to permit the movement of the rods 144 and 146 thereinto but to yieldably resist the extension of the rods therefrom as will be described in more detail hereinafter.

The normal method of operation is as follows: Machine 10 would be actuated so that the conveyor 12 conveys the meat product 38 from one end thereof to the other so as to pass beneath the reciprocating fluid manifold. Valve means 46 is in communication with the fluid pump 148 so that the proper fluid will be supplied to the valve means 46 at a predetermined pressure. Assuming that the arms 14 and 16 are in their upper positions, the stripper plate 120 will be positioned in a spaced relationship above the meat product 38 and the injector needles 36 will not be piercing the meat.

When the arms 14 and 16 are in their upper position, the rods 130 and 136 will be extended in an equal amount so that the stripper plate 120 will be substantially horizontally disposed. With the arms 14 and 16 in their raised position, the actuator rod 88 will have rotated the valve member 72 within the chamber 50 so that the discharge port 66 is completedly sealed. The cam roller 94 will be in the uppermost portion of upper end portion 106 at this time. With the discharge port 66 sealed, the fluid enters the chamber portion 50 by way of the inlet conduit 56 and discharges through the bypass conduit 58 as indicated by the arrows in FIG. 6. The fluid in chamber 50 passes outwardly through the openings 150 and 152 formed in the wall 154 which rotatably supports the inner end of the shaft 76 as illustrated in FIG. 7.

The fluid is able to return to the bypass conduit 58 since the fluid pressure in chamber portion 52 overcomes the pressure which is subjected to the outer end of the piston 60 by means of the air line 64. The fluid pressure in chamber portion 52 moves the piston 60 to the position illustrated in FIG. 6 to open the inner end of the bypass conduit 58. The bypass feature results in a constant fluid pressure being supplied to the valve means since the pressure in the valve means will not build up during the times that the discharge port 66 is closed. This feature insures that the fluid in the valve means will be at a constant pressure to prevent surges of the fluid being forced through the injector needles when the discharge port 66 is opened.

The downward movement of the arms 14 and 16 causes the manifold and the stripper plate 120 to be lowered. The stripper plate 120 engages the upper surface of the meat product as illustrated in FIG. 3 and positions itself along the upper surface thereof. The movable arms 130 and 136 permit the opposite ends of the stripper plate 120 to selectively adjust to an irregular thickness of the meat product. The needles 36 pierce the meat to inject the fluid thereinto.

Figure 8:
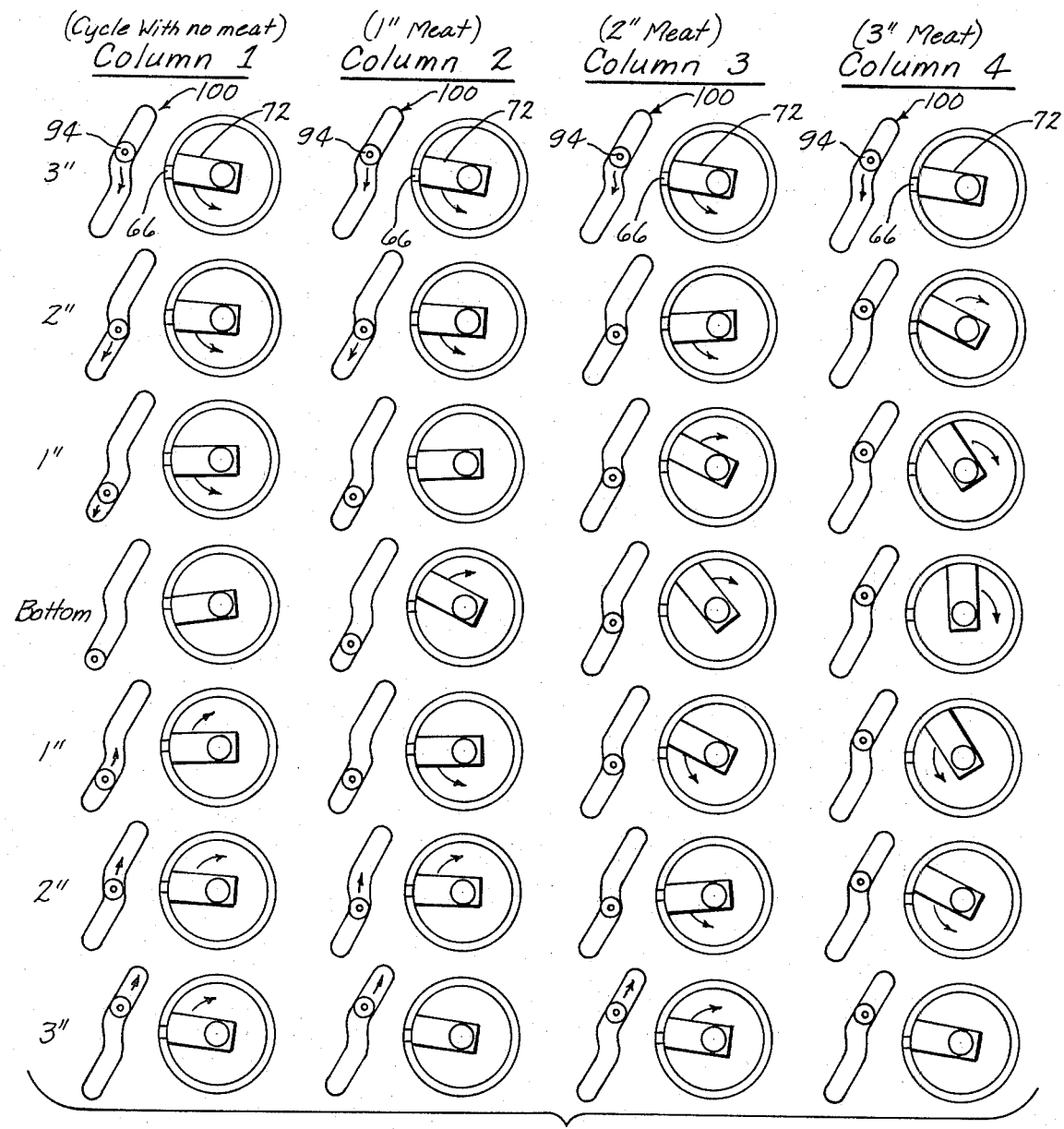
FIG. 8 is a schematic drawing showing the various positions of the metering valve during its cycles of operation.

The amount of fluid injected into the meat product is dependent upon the length of time valve 72 is open which in turn is dependent upon the position of stripper plate 120 and roller 94. This can best be illustrated by the schematic views in FIG. 8. Column 1 shows the various positions of roller 94 and valve 72 during a cycle wherein no meat is encontered. Roller 94 is at the upper end of slot 100 at the beginning of the cycle. Stripper plate 120 moves downwardly until it is approximately 3 inches above conveyor means 12, and roller 94 moves downwardly within slot 100 to the position shown in the top of Column 1 (FIG. 8). Upper end 106 of slot 100 is approximately concentric to the pivotal axis 17 of arms 14, 16 and therefore the angle of articulation of arm 90 and crank arm 86 (FIG. 5) remains unchanged during this initial downward part of the cycle. Accordingly, valve 72 remains stationary in its closed position as shown in the top of Column 1 from the top of the stroke until stripper plate 120 is approximately 3 inches above conveyor 12.

At this point however, roller 94 moves into intermediate portion 104 of slot 100 which deviates from a path concentric to the pivotal axis of arms 14, 16. As a result of this deviation, the angle of articulation of arm 90 and crank arm 86 changes, thereby causing valve 72 to move in a counterclockwise direction as stripper plate 120 progresses from 3 inches to the bottom of the stroke. As stripper plate 120 begins its upward movement, valve 72 rotates in a clockwise direction, reaching its initial position when stripper plate 120 reaches a height of approximately 3 inches above conveyor 12. While valve 72 moves during the cycle shown in Column 1, it is important to note that at all times it covers port 66 thereby remaining closed and preventing fluid from entering manifold 40.

When stripper plate 120 encounters meat during its downward cycle a different movement of valve 72 results. Column 2 illustrates what happens when a 1 inch piece of meat is encountered. The cycle is identical with that of Column 1 until stripper plate 120 reaches a height of 1 inch above conveyor 12. At this point stripper plate 120 engages the upper surface of the meat and ceases its downward movement. This causes roller 94 to stop moving in slot 100 also. But valve housing 48 continues downwardly in unison with manifold 20 and arms 14, 16. Shortly after stripper plate 120 engages the meat, needles 36 begin to pierce the meat. The relative movement between rod 88 (which is stationary) and valve housing 48 (which is moving downwardly) is absorbed by arm 90 and crank arm 86 so as to rotate valve member 72 in a clockwise direction (as viewed in FIG. 4) thereby opening discharge port 66 and supplying fluid under pressure to the interior of the fluid manifold.

Valve 72 begins moving in a clockwise direction as soon as stripper plate 120 engages the upper surface of the meat. In the case of 3 inch thick meat (Column 4, FIG. 8) valve 72 remains stationary up until stripper plate 120 engages the meat. However, in the cases of 1 inch or 2 inch meat (Columns 3 and 2 respectively) the valve moves a short distance in a counterclockwise direction prior to the time stripper plate 120 strikes the meat. The positions of valve 72 at the time of contact with 3 inch meat, 2 inch meat and 1 inch meat are shown respectively in Column 4, Row 1; Column 3, Row 2; and Column 2, Row 3. As can be seen from these drawings, valve 72 is displaced further in a counterclockwise position at the point of contact with 1 inch meat than it is at the point of contact with 2 or 3 inch meat. The effect of this displacement for the thinner meats is to delay the time between contact with the meat and opening of discharge port 66.

The importance of the delay in timing is illustrated in FIG. 9. Movement of needles 36 is controlled by the eccentric movement of rod 18 about pulley 19. Points A and D illustrate the positions of the lower end of rod 18 when needles 36 are 3 inches above conveyor 12. Points B and E illustrate the position at a needle height of 2 inches, the points C and F represent the position at a needle height of 1 inch.

Because of the arcuate path of the lower end of rod 18, the time interval that needles 36 are below 1 inch are not proportional to the time interval needles 36 are below 3 inches. That is, needles 36 are below 1 inch for a time interval that is greater than one-third of the time they are below 3 inches.

If valve 72 were to move to an open position immediately at the time needles 36 engage the meat, there would be a greater proportional amount of fluid injected into 1 inch thick meat than into three inch thick meat. Cam slot 100 corrects this disproportionate time interval so that 1 inch meat is exposed to approximately one-third as much fluid as 3 inch meat, and 2 inch meat is exposed to approximately two-thirds as much fluid as 3 inch meat. Points B' and E' (FIG. 9) illustrate the position of needles 36 when valve 72 opens and closes for 2 inch meat. Points C' and F' illustrate where needles 36 are when valve 72 opens and closes for 1 inch meat. The arc length between points is equivalent to time inasmuch as pulley 19 moves at a substantially constant rotational velocity. Thus arc C' F' is one-third of arc A D. Also arc B' E' is two-thirds of arc A D.

The timing of valve 72 can be adjusted or altered by replacing cam plate 96 with a different cam plate having a different cam slot 100. Also, the position of cam plate 96 with respect to cam roller 94 can be adjusted by bolts 97 to provide a fine adjustment of the timing of valve 72.

Stripper plate 120 senses the "average thickness" of the meat because of the fact that rod 88 is connected at the approximate longitudinal midpoint of stripper plate 120. Thus the position of roller 94 in cam slot 100 depends upon the height of the midpoint of stripper plate 120.

The stripper plate not only senses the "average" thickness and opens the discharge port 66 for the proper length of time, but it also serves in stripping the meat product from the needles since the dash pots 140 and 142 yieldably resist the upward movement of the opposite ends of the stripper plate. In other words, the stripper plate 120 slightly lags behind the injector needles during the upward movement thereof so that the needles may be withdrawn or stripped from the meat product. As described hereinbefore, the upward movement of the arms 14 and 16 causes the discharge port 66 to again close so that the fluid is not supplied to the injector needles when the injector needles are not penetrating or piercing the meat product.

Thus it can be seen that an improved machine for injecting fluid into meat products has been provided which insures that the proper amount of fluid will be supplied to the meat product responsive to the average thickness thereof. The valving means described herein also insures that a constant amount of fluid pressure will be supplied to the fluid manifold to prevent surges of fluid being supplied to the injector needles. Thus it can be seen that the invention accomplishes at least all of its stated objectives.

I claim:

1. A machine for injecting fluids into meat products and the like, comprising,
 a support means having a conveyor means movably mounted thereon, said conveyor means adapted to convey the meat product from one end thereof towards the other end thereof,
 a fluid manifold movably mounted above said conveyor means and being movable between lower and upper positions with respect to the conveyor means, a first power means reciprocatably moving said manifold between its upper and lower positions,
 said fluid manifold being fluidly connected to a source of fluid under pressure,
 said fluid manifold having a plurality of injecting needles extending downwardly therefrom adapted to pierce the meat product thereunder when said manifold is in its said lower position,
 valve means operatively connected to said fluid manifold and said fluid under pressure for selectively supplying said fluid to said injecting needles, said valve means being movable from closed to open positions, said valve means permitting said fluid to be supplied under pressure to said injecting needles when in its open position, said valve means preventing said fluid from being supplied under pressure to said injecting needles when in its closed position,
 a meat product thickness sensing means adapted to engage the meat product being pierced by said injecting needles,
 valve control means operatively interconnecting said sensing means and said valve means for selectively opening and closing said valve means responsive to the thickness of said meat product,
 said sensing means comprising an elongated plate means having opposite ends, the opposite ends of said plate means being vertically movably secured to opposite ends of said fluid manifold, said valve control means comprising a valve actuator rod secured at one end thereof to said plate means and extending therefrom, the other end of said rod being operatively secured to said valve means,
 said valve means being secured to said fluid manifold for movement therewith, said valve means comprising a valve port and a valve member adapted to open and close said valve port, said valve actuator rod being operatively connected to said valve member.

2. A machine for injecting fluids into meat products and the like, comprising,
 a support means having a conveyor means movably mounted thereon, said conveyor means adapted to convey the meat product from one end thereof towards the other end thereof,
 a fluid manifold movably mounted above said conveyor means and being movable between lower and upper positions with respect to the conveyor means, a first power means reciprocatably moving said manifold between its upper and lower positions,
 said fluid manifold being fluidly connected to a source of fluid under pressure,
 said fluid manifold having a plurality of injecting needles extending downwardly therefrom adapted to pierce the meat product thereunder when said manifold is in its said lower position,
 valve means operatively connected to said fluid manifold and said fluid under pressure for selectively supplying said fluid to said injecting needles, said valve means being movable from closed to open positions, said valve means permitting said fluid to be supplied under pressure to said injecting needles when in its open position, said valve means preventing said fluid from being supplied under pressure to said injecting needles when in its closed position,
 a meat product thickness sensing means adapted to engage the meat product being pierced by said injecting needles,
 valve control means operatively interconnecting said sensing means and said valve means for selectively opening and closing said valve means responsive to the thickness of said meat product,
 said sensing means comprising an elongated plate means having opposite ends, the opposite ends of said plate means being vertically movably secured to opposite ends of said fluid manifold, said valve control means comprising a valve actuator rod secured at one end thereof to said plate means and extending therefrom, the other end of said rod being operatively secured to said valve means,
 said first chamber being defined by a cylindrical wall member, said discharge port being formed in said cylindrical wall member and having a horizontally disposed rectangular configuration, said valve member having an arcuate valve surface which is in movable engagement with said cylindrical wall surface,
 said machine having rearward and forward ends,
 a first shaft rigidly secured to said valve member and extending laterally outwardly from said housing, a first crank means rigidly secured to the outer end of said first shaft and extending forwardly therefrom, a second crank means pivotally secured to the forward end of said first crank means, an upstanding arm rigidly connected at its lower end of the forward end of said second crank means, the upper end of said actuator rod being pivotally secured to the forward end of said second crank means, a cam plate means operatively secured to said support means, said cam plate means having a cam slot formed therein, the upper end of said upstanding arm being in operative engagement with said cam slot whereby relative vertical movement of said fluid manifold with respect to said sensing means will selectively cause said upstanding arm to rotate said shaft so that said valve member will move relative to said discharge port.

3. A machine for injecting fluids into meat products and the like, comprising,
- a support means having a conveyor means movably mounted thereon, said conveyor means adapted to convey the meat product from one end thereof towards the other end thereof,
- a fluid manifold movably mounted above said conveyor means and being movable between lower and upper positions with respect to the conveyor means, a first power means reciprocatably moving said manifold between its upper and lower positions,
- said fluid manifold being fluidly connected to a source of fluid under pressure,
- said fluid manifold having a plurality of injecting needles extending downwardly therefrom adapted to pierce the meat product thereunder when said manifold is in its said lower position,
- valve means operatively connected to said fluid manifold and said fluid under pressure for selectively supplying said fluid to said injecting needles, said valve means being movable from closed to open positions, said valve means permitting said fluid to be supplied under pressure to said injecting needles when in its open position, said valve means preventing said fluid from being supplied under pressure to said injecting needles when in its closed position,
- a meat product thickness sensing means adapted to engage the meat product being pierced by said injecting needles,
- valve control means operatively interconnecting said sensing means and said valve means for selectively opening and closing said valve means responsive to the thickness of said meat product,
- said sensing means comprising an elongated plate means having opposite ends, the opposite ends of said plate means being vertically movably secured to opposite ends of said fluid manifold, said valve control means comprising a valve actuator rod secured at one end thereof to said plate means and extending therefrom, the other end of said rod being operatively secured to said valve means,
- said one end of said valve actuator rod being pivotally secured to said stripper plate means intermediate the ends thereof.

4. A machine for injecting fluids into meat products and the like, comprising,
- a support means having a conveyor means movably mounted thereon, said conveyor means adapted to convey the meat product from one end thereof toward the other end thereof,
- a fluid manifold movably mounted above said conveyor means and being movable between lower and upper positions with respect to the conveyor means, a first power means reciprocatably moving said manifold between its upper and lower positions,
- said fluid manifold being fluidly connected to a source of fluid under pressure said fluid manifold having a plurality of injecting needles extending downwardly therefrom adapted to pierce the meat product thereunder when said manifold is in its said lower position,
- valve means operatively connected to said fluid manifold and said fluid under pressure for selectively supplying said fluid to said injecting needles, said valve means being movable from closed to open positions, said valve means permitting said fluid to be supplied under pressure to said injecting needles when in its open position, said valve means preventing said fluid from being supplied under pressure to said injecting needles when in its closed position,
- a meat product thickness sensing means adapted to engage the meat product being pierced by said injecting needles,
- valve control means operatively interconnecting said sensing means and said valve means for selectively opening and colsing said valve means responsive to the thickness of said meat product,
- said sensing means comprising an elongated plate means having opposite ends, the opposite ends of said plate means being vertically movably secured to opposite ends of said fluid manifold, said valve control means comprising a valve actuator rod secured at one end thereof to said plate means and extending therefrom, the other end of said rod being operatively secured to said valve means,
- wherein said valve means comprises a housing having a first chamber formed therein, said first chamber having an inlet port and a discharge port formed therein, said inlet port being in fluid communication with said source of fluid under pressure, said discharge port being in fluid communication with said fluid manifold, a valve member rotatably mounted in said first chamber adapted to open and close said discharge port, said valve actuator rod being operatively secured at its said other end to said valve member to cause the rotation thereof responsive to the movement of said plate means,
- a second chamber provided in said housing, said chamber having opposite ends, a fluid bypass line in fluid communication with one end of said second chamber and in fluid communication with said source of fluid under pressure, said housing having a fluid passageway formed therein which provides fluid communication between said inlet port and said bypass line, a piston slidably mounted in said chamber movable between first and second positions therein, said piston preventing fluid communication between said inlet port and said bypass line when in its first position and permitting fluid communication between said inlet port and said bypass line when in its second position, and means yieldably urging said piston towards its said first position.

5. A machine for injecting fluids into meat products and the like, comprising,
- a support means having a conveyor means movably mounted thereon, said conveyor means adapted to convey the meat product from one end thereof towards the other end thereof,
- a fluid manifold movably mounted above said conveyor means and being movable between lower and upper positions with respect to the conveyor means, a first power means reciprocatably moving said manifold between its upper and lower positions, said fluid manifold being fluidly connected to a source of fluid under pressure, said fluid manifold having a plurality of injecting needles extending downwardly therefrom adapted to pierce the meat product thereunder when said manifold is in its said lower position, valve means operatively connected to said fluid manifold and said fluid under pressure for selectively supplying said fluid to said injecting needles, said valve means being movable from closed to open positions, said valve means permitting said fluid to be supplied under pressure to said injecting needles when in its open position, said valve means preventing said fluid from being supplied under pressure to said injecting needles when in its closed position, a meat product thickness sensing means adapted to engage the meat product being pierced by said injecting needles, valve control means operatively interconnecting said sensing means and said valve means for selectively opening and closing said valve means responsive to the thickness of said meat product, said sensing means comprising an elongated plate means having opposite ends, the opposite ends of said plate means being vertically movably secured to opposite ends of said fluid manifold, said valve control means comprising a valve actuator rod secured at one end thereof to said plate means and extending therefrom, the other end of said rod being operatively secured to said valve means, said plate means comprising a stripper plate means having a plurality of openings formed therein for receiving said needles, a first length adjustable member secured to one end of said fluid manifold and extending downwardly therefrom, a second length adjustable member secured to the outer end of said fluid manifold and extending downwardly therefrom, the opposite ends of said stripper plate means being pivotally secured to the lower ends of said length adjustable members permitting the opposite ends of said stripper plate means to individually vertically move with respect to said support means when said stripper plate means engages a meat product having an irregular thickness.

6. A machine for injecting fluids into meat products and the like, comprising, a support means having a conveyor means movably mounted thereon, said conveyor means adapted to convey the meat product from one end thereof towards the other end thereof, a fluid manifold movably mounted above said conveyor means and being movable between lower and upper positions with respect to the conveyor means, a first power means reciprocatably moving said manifold between its upper and lower positions, said fluid manifold being fluidly connected to a source of fluid under pressure, said fluid manifold having a plurality of injecting needles extending downwardly therefrom adapted to pierce the meat product thereunder when said manifold is in its said lower position, valve means operatively connected to said fluid manifold and said fluid under pressure for selectively supplying said fluid to said injecting needles, said valve means being movable from closed to open positions, said valve means permitting said fluid to be supplied under pressure to said injecting needles when in its open position, said valve means preventing said fluid from being supplied under pressure to said injecting needles when in its closed position, a meat product thickness sensing means adapted to engage the meat product being pierced by said injecting needles, said sensing means comprising an elongated plate means having opposite ends, the opposite ends of said plate means being independently vertically movably secured to the opposite ends of said fluid manifold respectively, said valve control means comprising a valve actuator rod secured at one end thereof to said plate means intermediate the ends thereof and extending therefrom, the other end of said rod being operatively secured to said valve means for selectively opening and closing said valve means responsive to the average thickness of said meat product as sensed by said plate means.

7. A machine for injecting fluids into meat products and the like, comprising, a support means having a conveyor means movably mounted thereon, said conveyor means adapted to convey the meat product from one end thereof towards the other end thereof, a fluid manifold movably mounted above said conveyor means and being movable between first and second positions with respect to the conveyor means, a first power means reciprocatably moving said manifold between its second and first positions, said fluid manifold being fluidly connected to a source of fluid under pressure, said fluid manifold having a plurality of injecting needles extending therefrom adapted to pierce the meat product when said manifold is in its said first position, valve means opperatively connected to said fluid manifold and said fluid under pressure for selectively supplying said fluid to said injecting needles, said valve means being movable from closed to open positions, said valve means permitting said fluid to be supplied under pressure to said injecting needles when in its open position, said valve means preventing said fluid from being supplied under pressure to said injecting needles when in its closed position, a meat product thickness sensing means adapted to engage the meat product being pierced by said injecting needles, means mounting said sensing means relative to said fluid manifold whereby said sensing means senses the average thickness of said meat product, and valve control means operatively interconnecting said sensing means and said valve means for selectively opening and closing said valve means responsive to the average thickness of said meat product as sensed by said sensing means.

8. The machine of claim 7 wherein said valve control means includes means for opening said valve means a predetermined delayed time after said sensing means engages said meat product.

9. The machine of claim 6 wherein said valve means comprises a housing having a first chamber formed therein, said first chamber having an inlet port and a discharge port formed therein, said inlet port being in fluid communication with said source of fluid under pressure, said discharge port being in fluid communication with said fluid manifold, a valve member rotatably mounted in said first chamber adapted to open and close said discharge port, said valve actuator rod being operatively secured at its said other end to said valve member to cause the rotation thereof responsive to the movement of said plate means.

10. The machine of claim 9 wherein said first chamber is defined by a cylindrical wall member, said discharge port being formed in said cylindrical wall member and having a horizontally disposed rectangular configuration, said valve member having an arcuate valve surface which is in movable engagement with said cylindrical wall surface.

11. The machine of claim 2 wherein said cam slot comprises lower, intermediate and upper slot portions, a roller means operatively secured to the upper end of said upstanding arm and being received by said cam slot, said roller means moving downwardly in said slot in response to downward movement of said stripper plate; said first and second crank means cooperating to open said valve member when said fluid manifold continues downward movement below the point where said stripper plate engages a piece of meat on said conveyor means.

12. The machine of claim 11 wherein said intermediate and lower slot portions are angularly disposed to cause said valve member to open a predetermined delayed time after said stripper plate engages said meat.

13. The machine of claim 4 wherein said means yieldably urging said piston towards its said first position comprises a source of air under predetermined pressure.

14. The machine of claim 13 wherein said piston is normally in its said first position when said discharge port is open.

15. The machine of claim 5 wherein said length adjustable members each comprise shock absorber means.

16. The machine of claim 5 wherein a dash pot means is secured to said stripper plate means to yieldably resist the upward movement of said stripper plate means away from said meat product.

17. The method of injecting fluid into a meat product, comprising,
moving a meat product adjacent to and past a fluid injector needle means comprising a plurality of injector needles,
stopping the movement of said meat product adjacent said fluid injector needle means,
moving the fluid injector needle means so that the needles thereof will penetrate said meat product,
introducing fluid to said needles under pressure as said needles penetrate said meat whereby said fluid will be forced through said needles into said meat,
sensing the average thickness of the meat,
adjusting the time interval which fluid is injected into said meat according to the average thickness of said meat whereby varying thicknesses of meat will be injected with different predetermined amounts of fluid.

* * * * *